United States Patent
Borggaard

(10) Patent No.: US 11,010,779 B1
(45) Date of Patent: *May 18, 2021

(54) SYSTEM AND METHOD FOR REWARDING CUSTOMERS WHO INVITE OTHER CUSTOMERS TO A BUSINESS

(71) Applicant: Google LLC, Mountain View, CA (US)

(72) Inventor: Geoffrey Allen Borggaard, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/394,257

(22) Filed: Apr. 25, 2019

Related U.S. Application Data

(63) Continuation of application No. 14/269,021, filed on May 2, 2014, now Pat. No. 10,318,977, which is a continuation-in-part of application No. 13/231,899, filed on Sep. 13, 2011, now Pat. No. 8,768,762.

(51) Int. Cl.
    *G06Q 30/02*     (2012.01)

(52) U.S. Cl.
    CPC ............... *G06Q 30/0214* (2013.01)

(58) Field of Classification Search
    CPC ....... G06Q 30/02; G06Q 50/01; G06Q 10/00; H04W 4/02; H04W 4/021; H04W 4/029; H04W 4/80; H04W 12/06
    USPC .......................................... 705/5; 455/456.3
See application file for complete search history.

(56) References Cited

U.S. PATENT DOCUMENTS

| | | | |
|---|---|---|---|
| 6,533,168 B1 | 3/2003 | Ching | |
| 6,647,269 B2 * | 11/2003 | Hendrey | G06Q 30/0207 455/456.3 |
| 7,406,433 B2 * | 7/2008 | Mashimo | G06Q 30/02 705/5 |

(Continued)

FOREIGN PATENT DOCUMENTS

| | | |
|---|---|---|
| CN | 1661604 | 8/2005 |
| CN | 101064623 | 10/2007 |

(Continued)

OTHER PUBLICATIONS

Office Action issued in Chinese Application No. 201280054511.0 dated Apr. 15, 2016, 23 pages (with English translation).

(Continued)

*Primary Examiner* — Saba Dagnew
(74) *Attorney, Agent, or Firm* — Fish & Richardson P.C.

(57) ABSTRACT

A server receives an indication that a first user of a social network arrived at business, and identifies one or more second users associated with a predetermined area surrounding the commercial establishment, the one or more second users being connected to the first user through a social graph in the social network. The server sends to the one or more second users a first offering related to the business in conjunction with an indication that the first user arrived at the business. The server subsequently receives an indication that the one or more second users arrived at the business within a predetermined period of time after the first user arrived at the business, and sends a second offering related to the business to the first user in response to receiving the indication that the one or more second users arrived at the business.

20 Claims, 5 Drawing Sheets

(56) References Cited

U.S. PATENT DOCUMENTS

| | | | |
|---|---|---|---|
| 7,593,740 B2* | 9/2009 | Crowley | H04L 51/20 455/456.3 |
| 8,521,180 B2* | 8/2013 | Parish | H04W 12/06 455/456.1 |
| 8,768,762 B2 | 7/2014 | Borggaard | |
| 9,886,727 B2* | 2/2018 | Curtis | G06Q 50/01 |
| 2007/0252004 A1 | 11/2007 | Shiraki et al. | |
| 2008/0306826 A1 | 12/2008 | Kramer et al. | |
| 2009/0210480 A1 | 8/2009 | Sivasubramaniam et al. | |
| 2009/0234812 A1 | 9/2009 | Gupta et al. | |
| 2010/0141514 A1 | 6/2010 | Bell et al. | |
| 2012/0101883 A1 | 4/2012 | Akhter et al. | |

FOREIGN PATENT DOCUMENTS

| | | |
|---|---|---|
| CN | 101742639 | 6/2010 |
| CN | 101916417 | 12/2010 |
| CN | 102143462 | 8/2011 |
| CN | 102156943 | 8/2011 |

OTHER PUBLICATIONS

Office Action issued in Australian Application No. 2015201760 dated Jul. 8, 2016, 4 pages.
Office Action issued in Chinese Application No. 201280054511.0 dated Oct. 10, 2016, 25 pages.

* cited by examiner

SYSTEM AND METHOD FOR REWARDING CUSTOMERS WHO INVITE OTHER CUSTOMERS TO A BUSINESS

CROSS-REFERENCE TO RELATED APPLICATIONS

The present application is a continuation of U.S. patent application Ser. No. 14/269,021, filed on May 2, 2014, which is a continuation-in-part of U.S. patent application Ser. No. 13/231,899, filed on Sep. 13, 2011, all of which are hereby incorporated by reference in its entirety for all purposes.

TECHNICAL FIELD

The subject technology relates generally to rewarding users of social networks.

BACKGROUND

Smart phones and other GPS-enabled devices may be enabled to receive selective targeting by business establishments based on a transmitted location. For example, a smart device may notify a server associated with a business when its user comes within a predefined distance of the business, and, in response, the server may automatically transmit an advertisement or coupon for use at the business to the smart phone. In other aspects, a device may be integrated with a social network and configured to allow a user to "check-in" to a business and to share that information with other users in the user's social network group.

SUMMARY

The subject technology provides a system and computer-implemented method for rewarding customers who invite other customers to a business. According to various aspects, a method may include receiving, by one or more computing devices, an indication that a first user arrived at a commercial establishment, identifying one or more second users associated with a predetermined area surrounding the commercial establishment, sending, by the one or more computing devices, to the one or more second users a first offering related to the commercial establishment in conjunction with an indication that the first user arrived at the commercial establishment, receiving an indication that the one or more second users arrived at the commercial establishment, and sending a second offering related to the commercial establishment to the first user in response to receiving the indication that the one or more second users arrived at the commercial establishment. Other aspects include corresponding systems, apparatuses, and computer program products for implementation of the computer-implemented method.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings.

DETAILED DESCRIPTION

Figure 1:
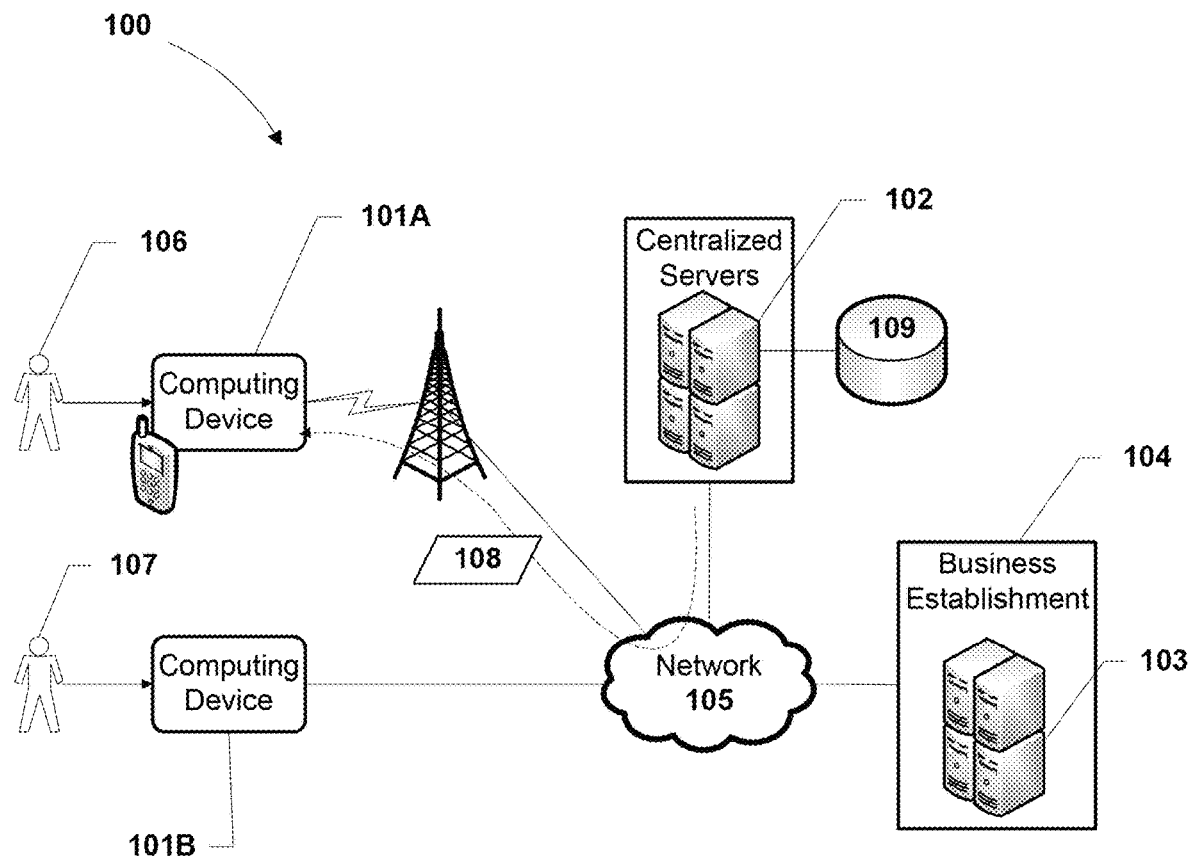
FIG. 1 is a diagram of an example system for targeting customers who invite other customers to a business establishment according to one example of the subject technology.

FIG. 1 is a diagram of an example system 100 for targeting customers who invite other customers to a business establishment according to one aspect of the subject technology. System 100 may include one or more smart computing devices 101A and 101B (for example, a smart phone, tablet or notebook computer, personal computer, PDA, or the like), one or more centralized servers 102, and one or more business servers 103 associated with a business establishment 104. Centralized servers 102 may be responsible for hosting a social network, including hosting message boards and forum discussions and the like, and for the sending and receiving of electronic messages to computing devices 101A and 101B over a network 105 (for example, a LAN, WAN, WiFi, cellular network, or the Internet). Centralized servers 102 or business servers 103 may be configured to provide one or more application programming interfaces (APIs) for the integration of mobile-to-web extension applications. For example, a social network hosted by centralized servers 102 may include a social check-in application that allows users of the social network to "check in" to a physical place using a smart phone, and share their location with their friends or contacts. In one aspect, users may check-in to the location by text messaging the location to centralized server 102. In another aspect, the application may use the phone's GPS to find the user's current location and then present a list of businesses at the current location to the user for selection. On one of the businesses being selected, the phone may send a message (for example, over network 105) to centralized servers 102 to update the social network with the user's current location.

In the depicted example, a computing device 101A (for example, a GPS-enabled smart phone) may be integrated with a check-in feature that enables a first subscribing user 106 to send an indication (for example, an announcement, message, or the like) to centralized servers 102 or business servers 103 that user 106 is at business establishment 104 (for example, at or near the first user's current geographic location). If the indication is received by business servers 103, business servers 103 may be configured to forward the indication to centralized servers 102. On receiving the indication, centralized servers 102 may send a message to other subscribing users 107 (for example, contacts of user 106 in a social network who are using a computing device 101B) that first user 106 is at business establishment 104. Subscribed users 107 may be designated or listed as contacts of user 106, or users of the social network who can view or receive messages from user 106. The message sent by servers 102 may be sent over network 105, through the social network, by way of an electronic text message or email, or the like.

In another aspect, the indication that user 106 is at business establishment 104 may be sent between computing devices 101A and 101B, for example, bypassing centralized servers 102. In this regard, centralized servers 102 may be configured to detect the indication sent from user 106 to the other users 107, and/or detect that the other users received the message that first user 106 is at business establishment 104. Computing devices 101A and 101B may, for example, be configured by a user with a separate application to inform other users that a user is at a business establishment, and to allow the detection of that notification by centralized servers 102. For example, computing devices 101A and 101B may be configured by its user to allow, for example, monitoring of a check-in application, text messages, instant messages, email, or the like.

In one aspect, if, during the time that first user 106 remains at business 104, one or more of the other users 107 check-in to the same business location, centralized servers 102 may determine that first user 106 invited the one or more other users 107 to join him or her at that business, and send targeted advertising to first user 106, or offer first user 106 an offering. For example, centralized servers 102 may be configured to receive one or more signals (for example, messages, notifications, or the like) that one or more users 107 arrived at business establishment 104 within a predetermined period of time (for example, 20 or 30 minutes) after the indication from user 106 was received. On receiving the one or more signals within the period of time, centralized servers 102 may send an offering 108 to user 106. Offering 108 may be included in an electronic publication (for example, an email), and may include an advertisement related to business 104, one or more coupons redeemable at business 104 (for example, for a free coffee), a reward, or the like. In one aspect, centralized servers 102 may send a targeted advertisement to the one more (for example, all) users 107 who arrived at business establishment 104 within the predetermined time. In other aspects, servers 102 may send an offering only after a predetermined number of users 107 arrive at business establishment 104 (for example, on receiving the last of a predetermined number of signals).

In another aspect, a centralized server 102 may include or be operably connected to a database 109. Centralized server 102 may store in database 109 information pertaining to each time an offering is sent to a user by centralized server 102, contact information (for example, an email address) for the subscribed users 106 or 107 who arrived at business establishment 104, metrics on sales generated through the efforts of identified users 106 or users 107, or the like. A report may be periodically generated (for example, monthly) by centralized server 102 and sent to business servers 103. Business establishment 104 may then use the contact information in the report to provide targeted advertising to those customers who frequently invite other customers to business establishment 104, or otherwise bring sales to business establishment 104 or a similar businesses establishment.

Centralized server 102 or business servers 103 may be responsible for automatically sending the subscribed users the previously described offerings or targeted advertisements. In a further aspect, business establishment 104, rather than centralized server 102, may be responsible for sending the offering to the users. To this end, centralized server 102 may merely make a determination that a group of users are patronizing the business establishment together, and then send that information to business server 103 (for example, by the previously described report). Business establishment 104 may then send those individuals an offering directly (for example, by email of by direct U.S. mail service).

Figure 2:
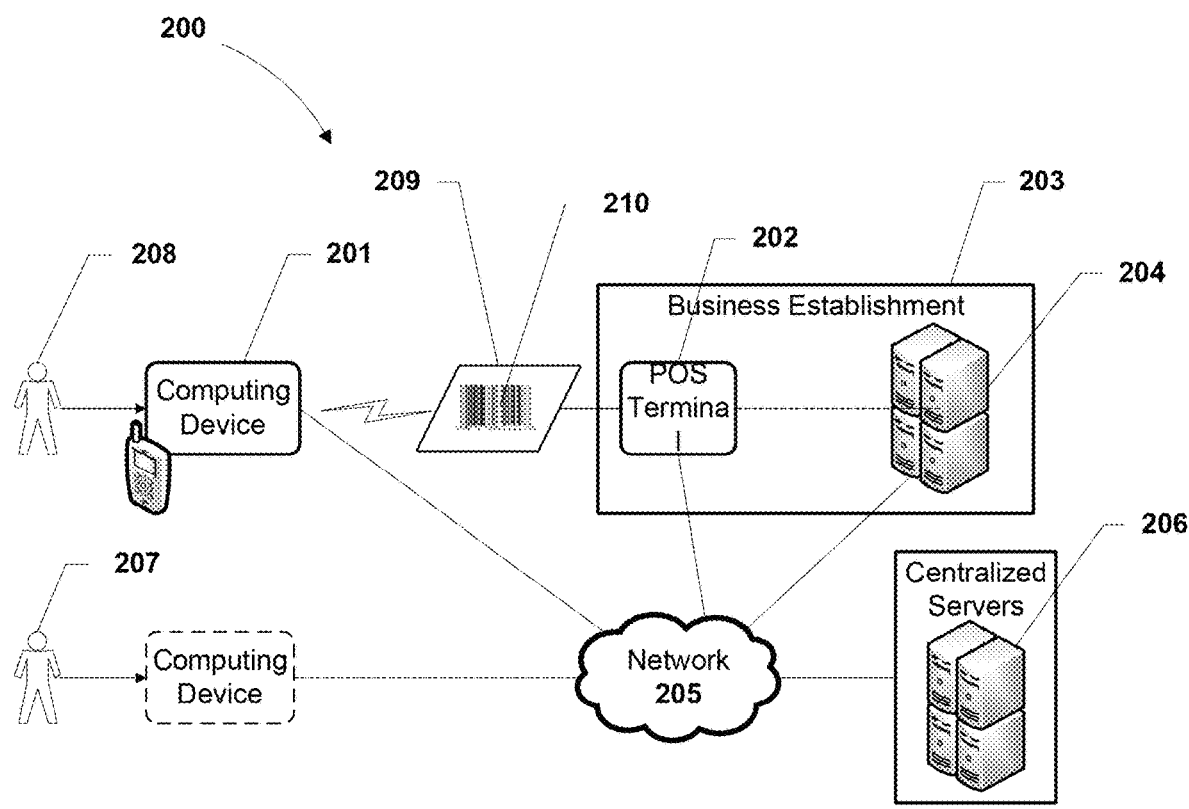
FIG. 2 is a diagram of an example system for targeting customers who invite other customers to a business establishment according to one example of the subject technology.

FIG. 2 is a diagram of an example system 200 for targeting customers who invite other customers to a business establishment according to one aspect of the subject technology. A system 200 may include one or more computing devices 201 (for example, computing devices 101A and 101B), and a point-of-sale (POS) terminal 202 at or associated with a business establishment 203. POS terminal 202 may be connected to a business server 204, for example, over a network 205. A centralized server 206 may be configured to send an offering to a first customer 207 (for example, user 106) if one or more second customers 208 (for example, users 107) makes a purchase at a business establishment 203. In one example, when a customer 208 makes a purchase, POS terminal 202 may provide customer 208 with a receipt 209, including a code 210 (for example, a barcode or sequence of numbers, letters, and/or symbols). Code 210 may specify a purchase code and/or the time and location of the purchase.

Customer 208 may enter or scan code 210 using his or her computing device 201, and device 201 may be configured to send the code 210, or information derived there from, to centralized server 206. For example, device 201 may send code 210 to centralized server 206 over network 205. In another aspect, customer 208 may text code 210 to a predetermined location (for example, phone number) printed on receipt 209. The scanning and/or sending of code 210 may cause device 201 to "check-in" to business establishment 203, or otherwise signal that customer 208 has arrived at business establishment 203. In another aspect, code 210 may inform centralized server 206 of the purchase, including, for example, the item purchased. After receiving code 210, centralized server 206 may send the previously described offering to first customer 207 or one or more second customers 208. In one aspect, purchase information obtained from code 210 may be used to limit the offering to certain products (for example, related to the purchase).

If multiple users in the same social group make a purchase at the same business establishment 203, within a certain period of time after an initial purchase (for example, by customer 207), centralized server 206 may make a determination that they came to the business together or to meet each other, and send one or more targeted advertisements to one or more of the users, or offer them the offering (for example, a coupon redeemable at the business or a similar business). In one aspect, centralized server 206 may determine that customer 207 (for example, who announced his or her location to the other users prior to the purchases being made) is the organizer of the group transactions, and send the advertisement or offering to that customer.

Figure 3:
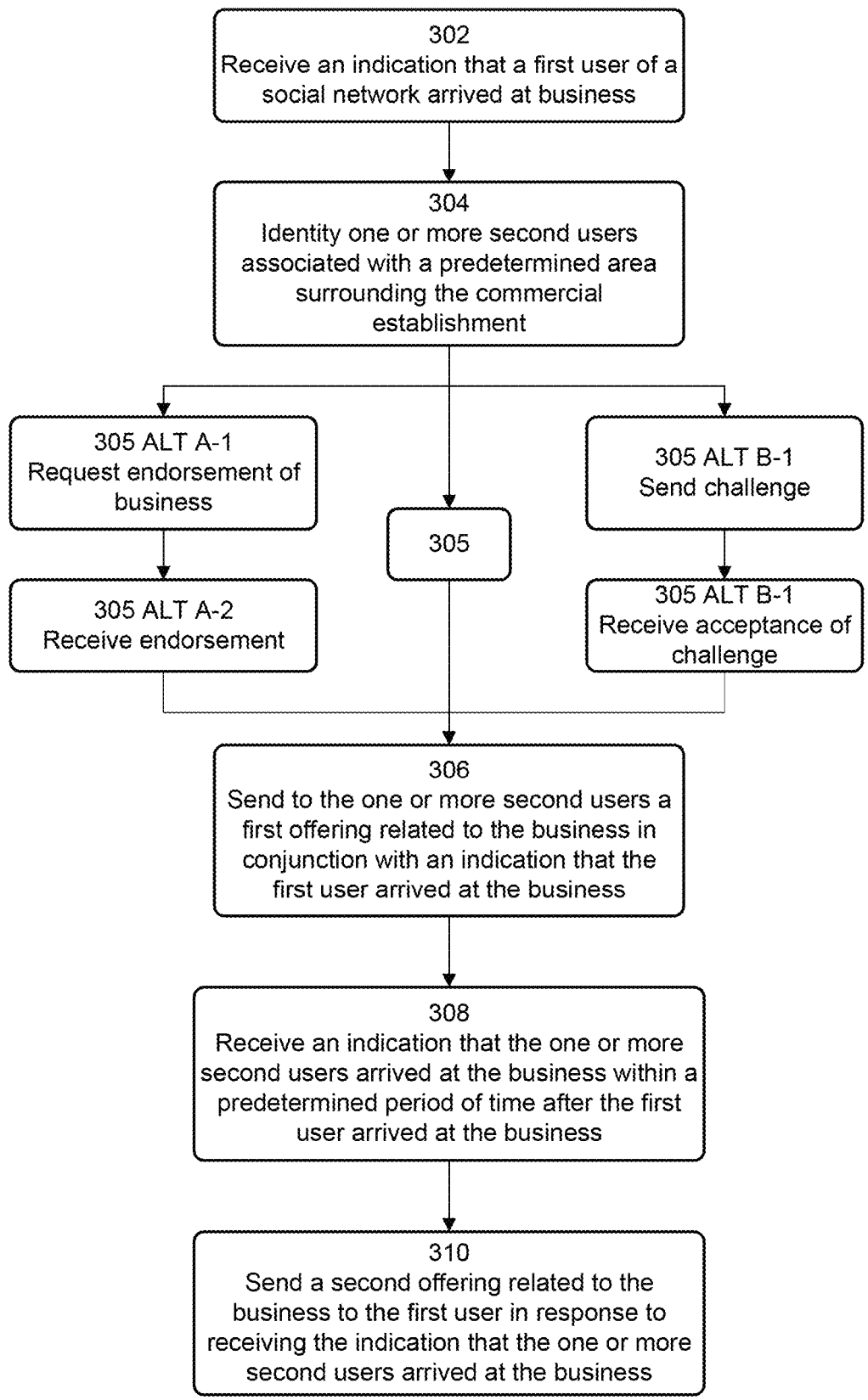
FIG. 3 is a flowchart illustrating example process for rewarding subscribed users who invite other users to a business establishment according to one example of the subject technology.

FIG. 3 illustrates a flow diagram of an example process 300 for rewarding users who invite other users to a commercial establishment. For explanatory purposes, example process 300 is described herein with reference to system 100 of FIG. 1 and/or system 200 of FIG. 2; however, example process 300 may also be applicable to portions of FIGS. 4 and 5 or other component and process described herein. Further for explanatory purposes, the blocks of example process 300 are described herein as occurring in serial, or linearly. However, multiple blocks of example process 300 may occur in parallel. In addition, the blocks of example process 300 need not be performed in the order shown and/or one or more of the blocks of example process 300 need not be performed.

In the depicted example flow diagram, a server (e.g., server 103 or 206) receives an indication that a first user of a social network arrived at a business (e.g., commercial establishment 203) (302). The indication may automatically be made upon an electronic detection (e.g., by a computing device at the business) that the first user arrived at the business. For example, in one or more implementations, a mobile device assigned to user 106 or 201 may come into communication with and/or is detected by a business device at a location associated with the business. For example, the business device may be POS terminal 202 that reads a bar code (e.g., bar code 210) displayed on the mobile device in connection with executing a purchase transaction at the business. In response to reading the bar code, a server (e.g., server 102 or 104) is notified (e.g., by POS terminal 202) that the mobile device has been detected, and the server may associate the mobile device with the first user, for example, by indexing a code received from the mobile device or bar code in database 109. In some implementations, the server may be located at the business, or at the headquarters of the business.

In some implementations, the first user may be detected when the first user checks-in to the business location through the social network or other associated check-in service. The first user may be detected by a computing device recognizing a previously known wireless signature of the first user's mobile device. For example, the user may opt-in to be recognized when the user enters the business. In some aspects, the wireless signature may be a log in to an account for wireless access at the business.

In response to detecting the first user at the business, one or more second users associated with a predetermined area surrounding the business are identified (304). In some implementations, the server is a server or group of servers responsible for implementation of the social network. Accordingly, the one or more second users may be, for example, connected to the first user through a social graph in the social network. The predetermined area may be defined by a predetermined radius around the business (e.g., a quarter mile radius). Accordingly, a user may be associated with the predetermined area by having travelled through the predetermined area more than a predetermined number of times (e.g., two times) over a predetermined window of time (e.g., the last week or month or year). The server may, for example, query an ancillary database that stores route information for users who have opted-in to having their commutes stored for the purpose of enhancing social interactions. An identified user may have, for example, travelled through the predetermined area more than four times in a week, or three times a week for a month or more. Additionally or in the alternative, a user may be associated with the predetermined area by way of being in the predetermined area when the indication that the first user arrived at the commercial establishment is received.

Once identified, the server may send a first offering related to the business to the identified second user(s) in conjunction with an indication that the first user arrived at the business (306). For example, the second users may receive a text message, email, or other near-instantaneous communication that informs them that the user is at or has recently been to the business, and including the offering within the communication. The first offering may be a coupon offering a discount off of a product or service provided by the business. For example, if the business is a coffee shop then the coupon may be an electronic coupon which provides them a ten percent discount off of a cup of coffee. The coupon may persist or expire after a predetermined time.

In one or more implementations, the first offering may be sent in response to receiving the indication that the first user arrived at the business and/or in response to or contemporaneous with the identification of the second users (305A). In one or more implementations, in response to the indication that a first user arrived at the predetermined location, the server may send a request to the first user for an endorsement of the business (305B-1). For example, the request may be sent immediately after the first user executes a purchase transaction at the business (e.g., buys a cup of coffee), or on a check-in to the business location through the social network or other associated check-in service. The first user may then endorse the business within the social network by writing and posting a written endorsement of the business to the user's social stream or by endorsing the social profile of the business (305B-2). The endorsement may be propagated through the social network to social contacts of the first user, for example, by posting a message to each user's social stream that the first user endorsed the business. The first offering and indication that the first user arrived at the predetermined location may then be sent to the one or more second users in response to the first user endorsing the business.

In some implementations, in response to the indication that a first user arrived at the predetermined location, the server may send a challenge to the first user (305C-1), the challenge challenging the user to attract the one or more second users to the commercial establishment. The first user may then accept the challenge (305C-2) and, on the server receiving an acceptance of the challenge from the first user, the first offering and indication that the first user arrived at the predetermined location may be sent to the one or more second users.

One goal of the subject technology is to get users to congregate at the business or a particular event. In this regard, the server waits to detect those second users who were identified and/or who were sent the first offering (and/or communication). As each respective second user arrives at the business, the respective user is detected and an indication sent to the server that the respective user arrived at the business. A user may be detected, for example, in the same manner as the first user (e.g., making an electronic purchase, check-in, or by known wireless signature). The server receives an indication that the one or more second users arrived at the business (308). In response to receiving an indication that a second user arrived at the business, the server may send a second offering related to the business to the first user in response to receiving the indication that the one or more second users arrived at the business. In some aspects, the second offering may be more substantial than the first offering. For example, if the first offering was a discount on a cup of coffee then the second offering may be a free cup of coffee.

In some implementations, the second offering is only sent to those second users who arrive at the business within a predetermined time (e.g., thirty minutes or an hour) after the first user is determined to have arrived at the business. Additionally or in the alternative, the second offering may only be sent when a threshold number of the identified second users arrived at the business, for example, within the predetermined time.

Figure 4:
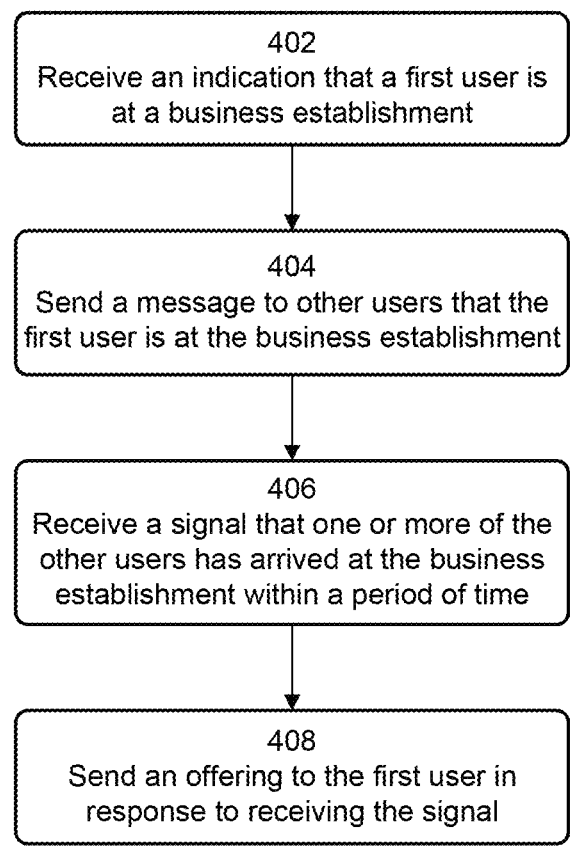
FIG. 4 is a flowchart illustrating an example process for rewarding subscribed users who invite other users to a business establishment according to one example of the subject technology.

FIG. 4 is a flowchart illustrating an example process for rewarding subscribed users who invite other users to a business establishment according to one aspect of the subject technology. According to one aspect, a social network (for example, system 100 or 200) may be integrated with a check-in service to recognize when a user subscribed to the social network is at a business establishment. In one or more implementations, an indication is received at a server that the subscribed user is at a business establishment (402). On receiving the indication, a message is sent to a plurality of users, informing them that the subscribed user is at the business establishment (404). In one aspect, the plurality of users may already be designated as "friends" of the subscribed user, or may be in the same social group with the subscribed user in a social network. A signal may then be received from one or more other users in a social group with the subscribed user that the one or more other users arrived at the business establishment within a predetermined period of time after the indication was received from the subscribed user (406). Accordingly, the one or more users from which the signal was received may be may be considered to be included in the plurality of users and invited to the business establishment by the subscribed user. In the depicted implementation, an offering is sent to the subscribed user in response to receiving the signal (408).

Many of the above-described example processes 300 and 400, and related features and applications, may be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

The term "software" is meant to include, where appropriate, firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
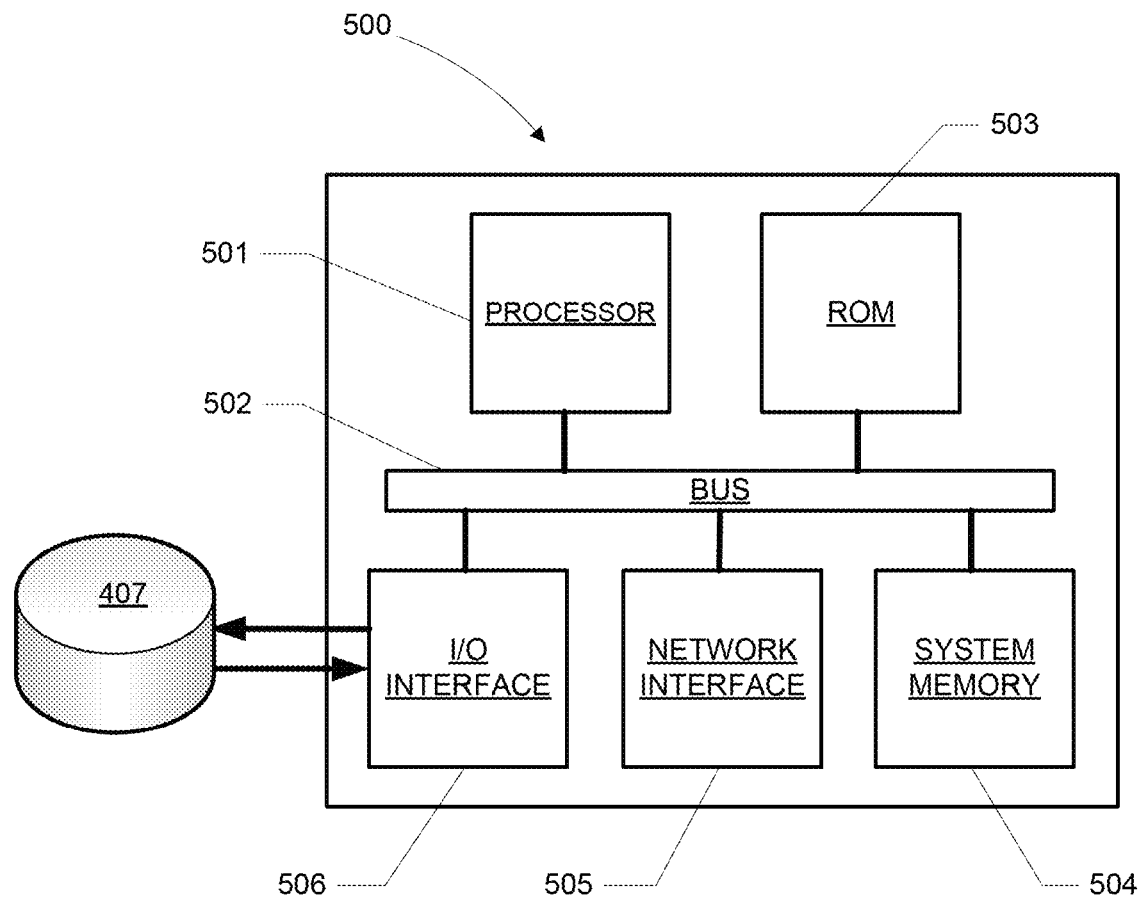
FIG. 5 is a diagram illustrating an example machine or computer for targeting customers who invite other customers to a business establishment, including a processor and other internal components, according to one example of the subject technology.

FIG. 5 is a diagram illustrating a machine or computer for targeting customers who invite other customers to a business establishment, including a processor and other internal components, according to one aspect of the subject technology. In some aspects, a computerized device 500 (for example, computing devices 101A or 101B or 201, server 102 or 103, or the like) includes several internal components such as a processor 501, a system bus 502, read-only memory 503, system memory 504, network interface 505, I/O interface 506, and the like. In one aspect, processor 501 may also be communication with a storage medium 507 (for example, a hard drive, database, or data cloud) via I/O interface 506. In some aspects, all of these elements of device 500 may be integrated into a single device. In other aspects, these elements may be configured as separate components.

Processor 501 may be configured to execute code or instructions to perform the operations and functionality described herein, manage request flow and address mappings, and to perform calculations and generate commands. Processor 501 is configured to monitor and control the operation of the components in server 500. The processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on a ROM within processor 501. Likewise, one or more sequences of instructions may be software stored and read from system memory 505, ROM 503, or received from a storage medium 507 (for example, via I/O interface 506). ROM 503, system memory 505, and storage medium 507 represent examples of machine or computer readable media on which instructions/code may be executable by processor 501. Machine or computer readable media may generally refer to any medium or media used to provide instructions to processor 501, including both volatile media, such as dynamic memory used for system memory 504 or for buffers within processor 501, and non-volatile media, such as electronic media, optical media, and magnetic media.

In some aspects, processor 501 is configured to communicate with one or more external devices (for example, via I/O interface 506). Processor 501 is further configured to read data stored in system memory 504 and/or storage medium 507 and to transfer the read data to the one or more external devices in response to a request from the one or more external devices. The read data may include one or more web pages and/or other software presentation to be rendered on the one or more external devices. The one or more external devices may include a computing system such as a personal computer, a server, a workstation, a laptop computer, PDA, smart phone, and the like.

In some aspects, system memory 504 represents volatile memory used to temporarily store data and information used to manage device 500. According to one aspect of the subject technology, system memory 504 is random access memory (RAM) such as double data rate (DDR) RAM.

Other types of RAM also may be used to implement system memory 504. Memory 504 may be implemented using a single RAM module or multiple RAM modules. While system memory 504 is depicted as being part of device 500, those skilled in the art will recognize that system memory 504 may be separate from device 500 without departing from the scope of the subject technology. Alternatively, system memory 504 may be a non-volatile memory such as a magnetic disk, flash memory, peripheral SSD, and the like.

I/O interface 506 may be configured to be coupled to one or more external devices, to receive data from the one or more external devices and to send data to the one or more external devices. I/O interface 506 may include both electrical and physical connections for operably coupling I/O interface 506 to processor 501, for example, via the bus 502. I/O interface 506 is configured to communicate data, addresses, and control signals between the internal components attached to bus 502 (for example, processor 501) and one or more external devices (for example, a hard drive). I/O interface 506 may be configured to implement a standard interface, such as Serial-Attached SCSI (SAS), Fiber Channel interface, PCI Express (PCIe), SATA, USB, and the like. I/O interface 506 may be configured to implement only one interface. Alternatively, I/O interface 506 may be configured to implement multiple interfaces, which are individually selectable using a configuration parameter selected by a user or programmed at the time of assembly. I/O interface 506 may include one or more buffers for buffering transmissions between one or more external devices and bus 502 and/or the internal devices operably attached thereto.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The term website, as used herein, may include any aspect of a website, including one or more web pages, one or more servers used to host or store web related content, and the like. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method for utilizing Global Positioning System (GPS) data, the method comprising:

implementing, by one or more servers, one or more application programming interfaces (APIs) that enable electronic communications between devices to integrate one or more extension applications with a social network application executing at client devices;

identifying, over one or more distributed networks and from an application of a first client device, data indicating that a first user of the first client device has performed a social check-in on the social network at a geographic location of a particular business using the first client device;

receiving a request for content from a second client device of a second user who is a connected to the first user within the social network; and responsive to receiving the request:
determining, based on GPS data obtained through the one or more APIs, that the second client device is within a predetermined area surrounding the geographic location of the particular business;

generating an offer designated for presentation to users (i) that are within the predetermined area surrounding the geographic location of the particular business as determined based on the GPS data obtained through the one or more APIs, and (ii) who are connected to one or more other users that performed the social check-in at the geographic location of the particular business; and transmitting, over the one or more distributed networks, the offer to the second client device based on (i) the second client device being within the predetermined area surrounding the geographic location of the particular business as determined based on the GPS data obtained through the one or more APIs, and (ii) the second user being connected to the first user in the social network.

2. The computer-implemented method of claim 1, wherein the GPS data indicating that the second client device is within a predetermined area surrounding the geographic location of the particular business further indicates that the second user has arrived at the geographic location within a predetermined period of time after the first user.

3. The computer-implemented method of claim 1, wherein determining that the second client device is within a predetermined area surrounding the geographic location of the particular business comprises: determining, based on the GPS data, that the user of the second client device travels through the predetermined area more than a predetermined number of times over a predetermined window of time.

4. The computer-implemented method of claim 1, wherein the first user and the second user are members of the social network, the second user being identified from a list of social contacts associated with the first user.

5. The computer-implemented method of claim 1, further comprising:
in response to identifying data indicating that a first user of the first client device has performed a social check-in on the social network at a geographic location of a particular business, sending a request to the first user for an endorsement of a commercial establishment, wherein the selected offer is sent to the second user in response to the first user endorsing the commercial establishment.

6. The computer-implemented method of claim 1, further comprising:
identifying, based on the GPS data, one or more other users that each have client devices that are within a predetermined area surrounding the geographic location of the particular business; and
determining that a threshold number of the identified one or more other users have arrived at the geographic location within a predetermined time after the GPS data indicating that the first user has arrived at the geographic location is received.

7. The computer-implemented method of claim 1, further comprising:
in response to identifying data indicating that the first user of the first client device has performed a social check-in on the social network at a geographic location of a particular business, identifying one or more other users and sending a challenge to the first user to attract the one or more other users to the geographic location; and
receiving an acceptance of the challenge from the first user, wherein the selected offer is sent to the one or more other users in response to the acceptance of the challenge.

8. The computer-implemented method of claim 1, wherein the GPS data indicating that the first user has arrived at the geographic location comprises an indication that the first user entered into a purchase transaction with a business at the geographic location.

9. A system for utilizing Global Positioning System (GPS) data, the system comprising:
one or more processors of one or more servers; and
a non-transitory computer readable memory storing instructions that, when executed by the one or more processors, causes the one or more processors to:
implement one or more application programming interfaces (APIs) that enable electronic communications between devices to integrate one or more extension applications with a social network application executing at client devices;

identify, over one or more distributed networks and from an application of a first client device, data indicating that a first user of the first client device has performed a social check-in on the social network at a geographic location of a particular business using the first client device;

receive a request for content from a second client device of a second user who is a connected to the first user within the social network; and responsive to receiving the request:
determine, based on GPS data obtained through the one or more APIs, that the second client device is within a predetermined area surrounding the geographic location of the particular business;

generate an offer designated for presentation to users that are within the predetermined area surrounding the geographic location of the particular business as determined based on the GPS data obtained through the one or more APIs, and (ii) who are connected to one or more other users that performed the social check-in at the geographic location of the particular business; and transmit, over the one or more distributed networks, the offer to the second client device based on (i) the second client device being within the predetermined area surrounding the geographic location of the particular business as determined based on the GPS data obtained through the one or more APIs, and (ii) the second user being connected to the first user in the social network.

10. The system of claim 9, wherein the GPS data indicating that the second client device is within a predetermined area surrounding the geographic location of the particular business further indicates that the second user has arrived at the geographic location within a predetermined period of time after the first user.

11. The system of claim 9, wherein determining that the second client device is within a predetermined area surrounding the geographic location of the particular business comprises: determining, based on the GPS data, that the user of the second client device travels through the predetermined area more than a predetermined number of times over a predetermined window of time.

12. The system of claim 9, wherein the first user and the second user are members of the social network, the second user being identified from a list of social contacts associated with the first user.

13. The system of claim 9, wherein the instructions, when executed, further cause the one or more processors to:
 in response to identifying data indicating that a first user of the first client device has performed a social check-in on the social network at a geographic location of a particular business, sending a request to the first user for an endorsement of a commercial establishment,
 wherein the selected offer is sent to the second user in response to the first user endorsing the commercial establishment.

14. The system of claim 9, wherein the instructions, when executed, further cause the one or more processors to:
 identify, based on the GPS data, one or more other users that each have client devices that are within a predetermined area surrounding the geographic location of the particular business; and
 determine that a threshold number of the identified one or more other users have arrived at the geographic location within a predetermined time after the GPS data indicating that the first user has arrived at the geographic location is received.

15. The system of claim 9, wherein the instructions, when executed, further cause the one or more processors to:
 in response to identifying data indicating that the first user of the first client device has performed a social check-in on the social network at a geographic location of a particular business, identify one or more other users and sending a challenge to the first user to attract the one or more other users to the geographic location; and
 receive an acceptance of the challenge from the first user, wherein the selected offer is sent to the one or more other users in response to the acceptance of the challenge.

16. The system of claim 9, wherein the GPS data indicating that the first user has arrived at the geographic location comprises an indication that the first user entered into a purchase transaction with a business at the geographic location.

17. A computer program product embodied in a non-transitive computer-readable medium including instructions for utilizing Global Positioning System (GPS) data, that when executed, cause one or more processors of one or more servers to:
 implement one or more application programming interfaces (APIs) that enable electronic communications between devices to integrate one or more extension applications with a social network application executing at client devices;
 identify, over one or more distributed networks and from an application of a first client device, data indicating that a first user of the first client device has performed a social check-in on the social network at a geographic location of a particular business using the first client device;
 receive a request for content from a second client device of a second user who is a connected to the first user within the social network; and
 responsive to receiving the request:
  determine, based on GPS data obtained through the one or more APIs, that the second client device is within a predetermined area surrounding the geographic location of the particular business;
  generate an offer designated for presentation to users that are within the predetermined area surrounding the geographic location of the particular business as determined based on the GPS data obtained through the one or more APIs, and (ii) who are connected to one or more other users that performed the social check-in at the geographic location of the particular business; and
  transmit, over the one or more distributed networks, the offer to the second client device based on (i) the second client device being within the predetermined area surrounding the geographic location of the particular business as determined based on the GPS data obtained through the one or more APIs, and (ii) the second user being connected to the first user in the social network.

18. The computer program product of claim 17, wherein the GPS data indicating that the second client device is within a predetermined area surrounding the geographic location of the particular business further indicates that the second user has arrived at the geographic location within a predetermined period of time after the first user.

19. The computer program product of claim 17, wherein determining that the second client device is within a predetermined area surrounding the geographic location of the particular business comprises: determining, based on the GPS data, that the user of the second client device travels through the predetermined area more than a predetermined number of times over a predetermined window of time.

20. The computer program product of claim 17, wherein the instructions, when executed, further cause the one or more processors to:
 in response to identifying data indicating that a first user of the first client device has performed a social check-in on the social network at a geographic location of a particular business, sending a request to the first user for an endorsement of a commercial establishment,
 wherein the selected offer is sent to the second user in response to the first user endorsing the commercial establishment.

* * * * *